(12) United States Patent
Tu et al.

(10) Patent No.: US 12,135,825 B2
(45) Date of Patent: Nov. 5, 2024

(54) METHOD AND APPARATUS FOR CUSTOM DEVELOPMENT OF PAYMENT APPLICATION, COMPUTER DEVICE, AND STORAGE MEDIUM

(71) Applicant: PAX COMPUTER TECHNOLOGY (SHENZHEN) CO., LTD., Guangdong (CN)

(72) Inventors: Qinkui Tu, Guangdong (CN); Shaolin Wang, Guangdong (CN)

(73) Assignee: PAX COMPUTER TECHNOLOGY (SHENZHEN) CO., LTD., Guangdong (CN)

( * ) Notice: Subject to any disclaimer, the term of this patent is extended or adjusted under 35 U.S.C. 154(b) by 579 days.

(21) Appl. No.: 17/785,822

(22) PCT Filed: Oct. 31, 2019

(86) PCT No.: PCT/CN2019/114634
§ 371 (c)(1),
(2) Date: Jun. 15, 2022

(87) PCT Pub. No.: WO2020/134536
PCT Pub. Date: Jul. 2, 2020

(65) Prior Publication Data
US 2023/0351050 A1    Nov. 2, 2023

(30) Foreign Application Priority Data
Dec. 28, 2018  (CN) .......................... 201811626262.3

(51) Int. Cl.
*G06F 21/64*     (2013.01)
*G06F 8/71*      (2018.01)

(52) U.S. Cl.
CPC ................ *G06F 21/64* (2013.01); *G06F 8/71* (2013.01)

(58) Field of Classification Search
CPC ........ G06F 21/64; G06F 8/71; G06F 9/44505; G06F 8/65; G07G 1/12
See application file for complete search history.

(56) References Cited

U.S. PATENT DOCUMENTS 5,892,904 A *  4/1999  Atkinson ................ G06F 21/64
                                            713/170
6,275,978 B1 * 8/2001  Bell ........................ G06F 9/454
                                            704/8
(Continued)

FOREIGN PATENT DOCUMENTS

CN          1777317 A      5/2006
CN        101110694 A      1/2008
(Continued)

OTHER PUBLICATIONS

International Preliminary Report on Patentability for International Application No. PCT/CN2019/114634; Date of Issuance: Jun. 16, 2021; 5 Pages.

(Continued)

*Primary Examiner* — Aravind K Moorthy
(74) *Attorney, Agent, or Firm* — CANTOR COLBURN LLP

(57) ABSTRACT

A method and an apparatus for custom development of a payment application, a computer equipment and a storage medium. The method includes: acquiring a resource file uploaded by a user terminal to an application market server through an application market client; writing the resource file into a device operation service; acquiring the resource file from the device operation service through a device operation interface, and saving the same in a storage space of an application; and loading the resource file saved in the storage space of the application through the application, and executing a function of the resource file.

15 Claims, 6 Drawing Sheets

(56) References Cited

U.S. PATENT DOCUMENTS

| | | | | |
|---|---|---|---|---|
| 6,393,420 | B1* | 5/2002 | Peters | G06F 16/958 707/999.102 |
| 7,069,554 | B1* | 6/2006 | Stammers | G06F 9/445 717/176 |
| 7,243,335 | B1* | 7/2007 | Andrew | G06F 8/38 717/115 |
| 7,603,257 | B1* | 10/2009 | Warren | G06F 11/3428 702/186 |
| 8,051,043 | B2* | 11/2011 | Young | G06F 21/602 707/681 |
| 8,078,726 | B2* | 12/2011 | Thomason | G06F 16/9574 709/225 |
| 8,134,132 | B2 | 3/2012 | Hopkins et al. | |
| 8,161,012 | B1* | 4/2012 | Gerraty | G06F 21/53 718/1 |
| 8,171,004 | B1* | 5/2012 | Kaminski, Jr. | G06F 16/951 711/216 |
| 8,572,743 | B2* | 10/2013 | Di Crescenzo | G06F 21/565 713/188 |
| 9,507,783 | B1* | 11/2016 | Carpenter | G06F 16/185 |
| 9,692,770 | B2* | 6/2017 | Ike | H04L 63/126 |
| 10,140,103 | B2 | 11/2018 | Zheng et al. | |
| 10,949,088 | B1* | 3/2021 | Chinthekindi | G06F 16/1752 |
| 10,979,440 | B1* | 4/2021 | Kalika | H04L 9/3247 |
| 2002/0048372 | A1* | 4/2002 | Toh | H04L 9/3297 713/180 |
| 2002/0055942 | A1* | 5/2002 | Reynolds | G06F 21/64 |
| 2002/0194484 | A1* | 12/2002 | Bolosky | G06F 21/64 713/189 |
| 2003/0159055 | A1* | 8/2003 | Robbins | G06F 21/64 713/193 |
| 2003/0188160 | A1* | 10/2003 | Sunder | H04L 69/329 713/165 |
| 2004/0054906 | A1* | 3/2004 | Carro | H04L 9/3236 713/176 |
| 2004/0064703 | A1* | 4/2004 | Makita | G06F 21/6218 713/176 |
| 2004/0172276 | A1 | 9/2004 | Kamo | |
| 2004/0193888 | A1* | 9/2004 | Wiseman | G06F 21/64 713/176 |
| 2005/0060541 | A1* | 3/2005 | Angelo | G06F 21/64 726/4 |
| 2005/0120106 | A1* | 6/2005 | Albertao | H04L 67/34 709/223 |
| 2005/0138397 | A1* | 6/2005 | Kusudo | H04N 21/43853 348/E5.006 |
| 2005/0177812 | A1* | 8/2005 | Andrew | G06F 9/451 717/100 |
| 2005/0188214 | A1* | 8/2005 | Worley | G06F 21/52 713/187 |
| 2005/0204142 | A1* | 9/2005 | Axelsson | H04L 9/3236 713/182 |
| 2006/0015746 | A1* | 1/2006 | Kusudo | H04N 21/4433 348/E5.002 |
| 2006/0095792 | A1* | 5/2006 | Hurtado | G06F 21/10 713/189 |
| 2006/0126468 | A1* | 6/2006 | McGovern | G06F 21/64 369/47.1 |
| 2006/0130154 | A1* | 6/2006 | Lam | G06F 21/64 726/30 |
| 2007/0124446 | A1* | 5/2007 | Coulthard | G06Q 10/06 709/207 |
| 2008/0115141 | A1* | 5/2008 | Welingkar | G06F 11/1464 718/104 |
| 2009/0097644 | A1* | 4/2009 | Haruki | G11B 20/00492 707/999.001 |
| 2009/0210702 | A1* | 8/2009 | Welingkar | G06F 8/60 713/168 |
| 2009/0328028 | A1* | 12/2009 | O'Rourke | G06F 8/65 717/173 |
| 2010/0088695 | A1* | 4/2010 | Kakinari | G06F 9/454 709/217 |
| 2010/0205460 | A1* | 8/2010 | Lin | G06F 21/606 713/193 |
| 2011/0161370 | A1* | 6/2011 | Miyamae | G06F 16/10 707/E17.143 |
| 2011/0295816 | A1* | 12/2011 | Sasano | G06F 21/121 707/690 |
| 2012/0030724 | A1* | 2/2012 | Godas | H04N 21/6118 725/111 |
| 2012/0079551 | A1* | 3/2012 | Isozaki | H04N 21/4622 725/118 |
| 2012/0084347 | A1* | 4/2012 | Fay | H04L 67/02 709/203 |
| 2012/0150816 | A1* | 6/2012 | Pafumi | G06F 11/1441 707/E17.007 |
| 2012/0226791 | A1* | 9/2012 | Ramaswamy | H04L 41/12 709/223 |
| 2013/0104114 | A1* | 4/2013 | Reiss | G06F 8/65 717/170 |
| 2013/0166909 | A1* | 6/2013 | Agrawal | H04L 63/123 713/168 |
| 2013/0169985 | A1* | 7/2013 | Inomata | G06F 21/608 358/1.13 |
| 2013/0191397 | A1* | 7/2013 | Avadhanam | G06F 16/24578 707/E17.084 |
| 2013/0263096 | A1* | 10/2013 | Hulick | G06F 11/3495 717/130 |
| 2013/0311598 | A1* | 11/2013 | Arrouye | G06Q 10/10 709/217 |
| 2014/0020071 | A1* | 1/2014 | Jannelli | G06F 21/335 726/5 |
| 2014/0156866 | A1* | 6/2014 | Kallstrom | H04L 67/01 718/1 |
| 2014/0289531 | A1* | 9/2014 | Yamakawa | H04L 9/3247 713/168 |
| 2015/0006895 | A1* | 1/2015 | Irvine | G06F 21/6209 713/171 |
| 2015/0073911 | A1 | 3/2015 | Zhao | |
| 2015/0154181 | A1* | 6/2015 | Dmytryshyn | G06F 9/454 704/2 |
| 2015/0172286 | A1* | 6/2015 | Tomlinson | H04L 9/321 726/7 |
| 2015/0180863 | A1* | 6/2015 | Kobayashi | H04L 47/70 726/9 |
| 2015/0277885 | A1* | 10/2015 | Kimoto | G06F 8/71 717/174 |
| 2016/0164900 | A1* | 6/2016 | Pericin | G06F 16/13 726/23 |
| 2016/0283204 | A1* | 9/2016 | Zaiwei | G06F 3/033 |
| 2016/0317933 | A1* | 11/2016 | Shoshan | A63F 13/422 |
| 2017/0115981 | A1* | 4/2017 | Oh | G06F 21/64 |
| 2017/0139691 | A1* | 5/2017 | Zheng | H04L 67/12 |
| 2017/0180137 | A1* | 6/2017 | Spanier | G06F 8/65 |
| 2017/0230339 | A1* | 8/2017 | Xie | G06F 21/64 |
| 2017/0310753 | A1* | 10/2017 | Knothe | H04L 67/02 |
| 2018/0091484 | A1* | 3/2018 | Atta | G06F 15/7871 |
| 2018/0101684 | A1* | 4/2018 | Murphy | G06F 21/64 |
| 2018/0158162 | A1* | 6/2018 | Ramasamy | H04L 9/3239 |
| 2018/0183600 | A1* | 6/2018 | Davis | G06F 16/951 |
| 2018/0206092 | A1 | 7/2018 | Beenau et al. | |
| 2018/0212782 | A1* | 7/2018 | Csik | G06F 21/64 |
| 2018/0268413 | A1* | 9/2018 | Phadke | G07C 9/257 |
| 2018/0321965 | A1* | 11/2018 | Rahman | G06F 9/455 |
| 2018/0322176 | A1* | 11/2018 | Busayarat | G06F 16/168 |
| 2018/0365448 | A1* | 12/2018 | Uhr | G06Q 20/36 |
| 2019/0056961 | A1* | 2/2019 | Dimov | G06F 40/58 |
| 2019/0104128 | A1* | 4/2019 | Carol | H04L 9/3226 |
| 2019/0205420 | A1* | 7/2019 | Tana | G06F 16/164 |
| 2019/0205971 | A1* | 7/2019 | Deo | H04L 67/535 |
| 2019/0227780 | A1* | 7/2019 | Keyser | H04L 67/306 |
| 2019/0342074 | A1* | 11/2019 | Housholder | G06F 21/6218 |
| 2020/0037005 | A1* | 1/2020 | Lin | H04N 21/63345 |
| 2020/0272785 | A1* | 8/2020 | Lai | G06F 16/986 |

FOREIGN PATENT DOCUMENTS

| | | |
|---|---|---|
| CN | 101710436 A | 5/2010 |
| CN | 102662652 A | 9/2012 |

(56) References Cited

FOREIGN PATENT DOCUMENTS

| | | |
|---|---|---|
| CN | 103678319 A | 3/2014 |
| CN | 104503741 A | 4/2015 |
| CN | 104834530 A | 8/2015 |
| CN | 106371866 A | 2/2017 |
| CN | 106569863 A | 4/2017 |
| CN | 106843978 A | 6/2017 |
| CN | 107423101 A | 12/2017 |
| CN | 107528713 A | 12/2017 |
| CN | 108549555 A | 9/2018 |
| CN | 109766084 A | 5/2019 |
| WO | 2008105642 A1 | 9/2008 |

OTHER PUBLICATIONS

International Search Report for International Application No. PCT/CN2019/114634; Date of Completion: Jan. 10, 2020; Date of Mailing: Jan. 31, 2020; 4 Pages.

Seema Nambiar, Chang-Tien Lu and Lily R. Liang, "Analysis of payment transaction security in mobile commerce," Proceedings of the 2004 IEEE International Conference on Information Reuse and Integration, 2004. IRI 2004., 2004, pp. 475-480.

Translation of International Search Report for International Application No. PCT/CN2019/114634; Date of Completion: Jan. 10, 2020; Date of Mailing: Jan. 31, 2020; 2 Pages.

Translation of Written Opinion for International Application No. PCT/CN2019/114634; Date of Mailing: Jan. 31, 2020; 4 Pages.

Written Opinion for International Application No. PCT/CN2019/114634; Date of Mailing: Jan. 31, 2020; 4 Pages.

\* cited by examiner

METHOD AND APPARATUS FOR CUSTOM DEVELOPMENT OF PAYMENT APPLICATION, COMPUTER DEVICE, AND STORAGE MEDIUM

CROSS-REFERENCE TO RELATED APPLICATIONS

This application is a National Stage Appl. filed under 35 USC 371 of International Patent Application No. PCT/CN2019/114634 with an international filing date of Oct. 31, 2019, designating the United States, now pending, which claims the priority of the Chinese Patent Application No. 201811626262.3 filed on Dec. 28, 2018. The contents each of which are incorporated herein by reference.

TECHNICAL FIELD

The present application relates to the field of computer technology, and in particular, to a method for custom development of a payment application, an apparatus for custom development of a payment application, a computer equipment and a storage medium.

BACKGROUND

With the large-scale use of POS (point of sale, payment terminals), users' demands for POS terminals are also increasing. In order to meet different requirements of the user, platforms customized for POS terminals have appeared on the market. However, at present, those kinds of platforms customized for POS terminal are implemented by way of hard-coding to meet the user's requirements. The hard-coding approach requires the user to re-submit codes in order to implement the desired new functions, and have to wait for the platform to be released before the new functions can be used, thus the update time is longer.

TECHNICAL PROBLEM

In view of this, it is necessary to address the above technical problem by providing a method and an apparatus for custom development of a payment application, a computer equipment or a storage medium, that can be updated quickly.

TECHNICAL SOLUTIONS

Disclosed is a method for custom development of a payment application, which includes the following steps: acquiring, through an application market client, a resource file uploaded by a user terminal to an application market server; writing the resource file into a device operation service; acquiring, through a device operation interface, the resource file from the device operation service and storing the resource file in a storage space of an application; and loading, through the application, the resource file stored in the storage space of the application, and executing a function of the resource file.

In one embodiment, the step of writing the resource file into a device operation service includes: acquiring a system public key, and decrypting signature information of the resource file by means of the system public key, to obtain a first hash value of the resource file; invoking a system algorithm, and calculating a second hash value of the resource file by means of the system algorithm; comparing the first hash value with the second hash value; and writing the resource file, a name of the resource file, and a hash value of the resource file into the device operation service when the first hash value and the second hash value are consistent.

In one embodiment, the step of acquiring the corresponding resource file from the device operation service through the device operation interface includes: acquire a name of the device operation interface; matching the name of the device operation interface with a name of the resource file in the device operation service; and when the name of the device operation interface and the name of the resource file in the device operation service are successfully matched, acquiring the resource file whose name is successfully matched.

In one embodiment, after the resource file is written into the device operation service, the method also includes: acquiring a first version number of the resource file through a device management interface, and sending the first version number to the application market server, where the first version number is used to instruct the application market server to acquire a second version number of the resource file, and comparing the first version number with the second version number; receiving a new resource file returned by the application market server when the first version number and the second version number are inconsistent; and replacing the resource file in the device operation service with the new resource file.

In one embodiment, the step of acquiring the resource file from the device operation service through a device operation interface and saving the same in a storage space of an application includes: acquiring a third hash value of the resource file stored in the application storage space through the device operation interface, and acquiring a fourth hash value of the resource file of the device operation service; comparing the third hash value with the fourth hash value; determining that the resource file has an update when the third hash value and the fourth hash value are inconsistent, and acquiring a new resource file from the device operation service through the device operation interface; and replacing the resource file saved in the storage space of the application with the new resource file.

In an embodiment, before the third hash value of the resource file stored in the storage space of the application is acquired through the device operation interface, and the fourth hash value of the resource file of the device operation service is acquired, the method also includes: receiving an operation on the application, and invoking a corresponding device operation interface according to the operation.

Disclosed is an apparatus for custom development of a payment application. The apparatus includes: an acquisition module, a writing module, a storage module and a loading module. The acquisition module is configured to acquire a resource file uploaded by a user terminal to an application market server through an application market client. The writing module is configured to write the resource file into a device operation service. The storage module is configured to acquire the resource file from the device operation service through a device operation interface, and save the response file in a storage space of an application. The loading module is configured to load the resource file saved in the storage space of the application through the application, and execute a function of the resource file.

In one embodiment, the writing module includes: a decryption unit, an invoke unit, a comparison unit and a writing unit. The decryption unit is configured to acquire a system public key, and decrypt signature information of the resource file by means of the system public key to obtain a first hash value of the resource file. The invoke unit is configured to invoke a system algorithm, and calculate the second hash value of the resource file by means of the system algorithm. The comparison unit is configured to compare the first hash value with the second hash value. The writing unit is configured to write the resource file, a name of the resource file and a hash value of the resource file into the device operation service when the first hash value and the second hash value are consistent.

Disclosed is a computer equipment, which includes a memory and a processor, the memory stores a computer program, and the computer program when being executed by the processor, causes the processor to implement the steps of the above method.

Disclosed is a computer-readable storage medium, on which a computer program is stored, and when the computer program is executed by a processor, the steps of the above method are implemented.

BENEFICIAL EFFECTS

In the above-mentioned method and apparatus for custom development of a payment application, the computer equipment and the storage medium, the resource file uploaded by the user terminal to the application market server is acquired through the application market client, and written the same into the device operation service. The resource file is realized by the user himself, which enables the user to complete a customization according to his own requirements, and thus the universality of the customized development platform of the payment application is achieved. The resource file is acquired from the device operation service through the device operation interface, and saved the same in the storage space of the application, so that the resource file can be directly acquired from the storage space of the application, saving the time to invoke the resource file from the device operation service. Moreover, the resource file saved in the storage space of the application is loaded through the application to execute the function of the resource file, so that the problem of waiting for the released of the new version caused by the usual way of solidifying code can be avoided, which helps to improve the stability of the custom development platform of the payment application, and the convenience of updating resource files.

DETAILED DESCRIPTION OF THE EMBODIMENTS

In order to illustrate the objectives, technical solutions and advantages of the present application more clearly, the present application will be described in further detail below with reference to the drawings and embodiments. It should be understood that the specific embodiments described herein are only used to explain the present application, but not to limit the present application.

Figure 1:
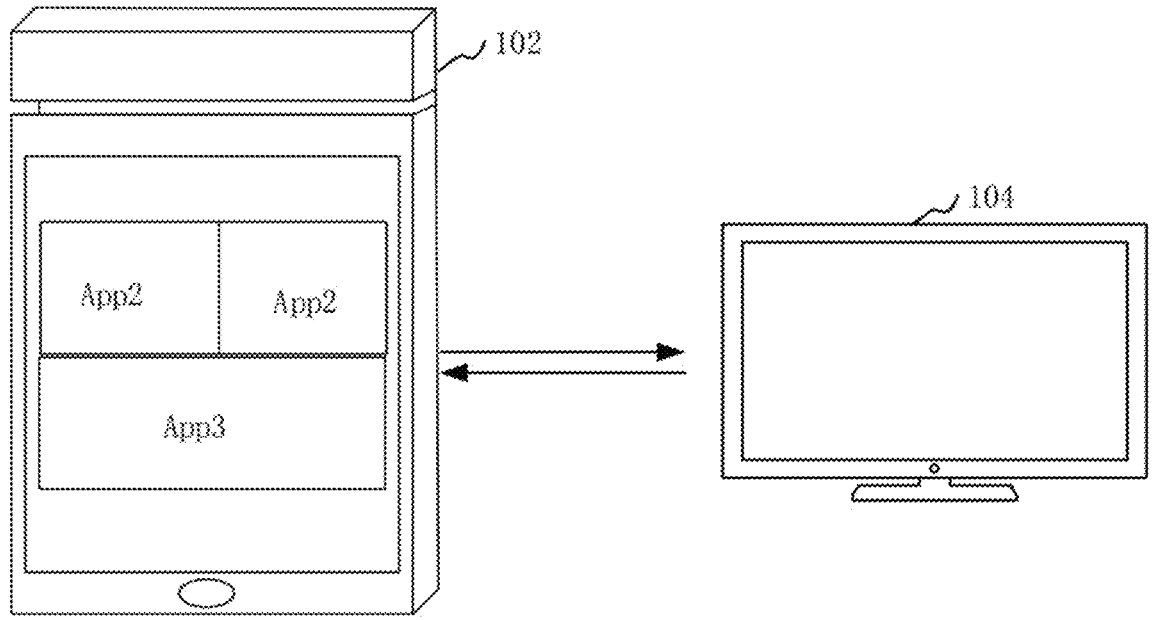
FIG. 1 is an application environment diagram of a method for custom development of a payment application in one embodiment.

An embodiment of the present application provides a method for custom development of a payment application, which may be applied to the application environment shown in FIG. 1. In which, a POS terminal 102 is in communication with another computer equipment 104 through an interface. The POS terminal 102 may be a stationary POS machine or a mobile POS machine or the like.

Figure 2:
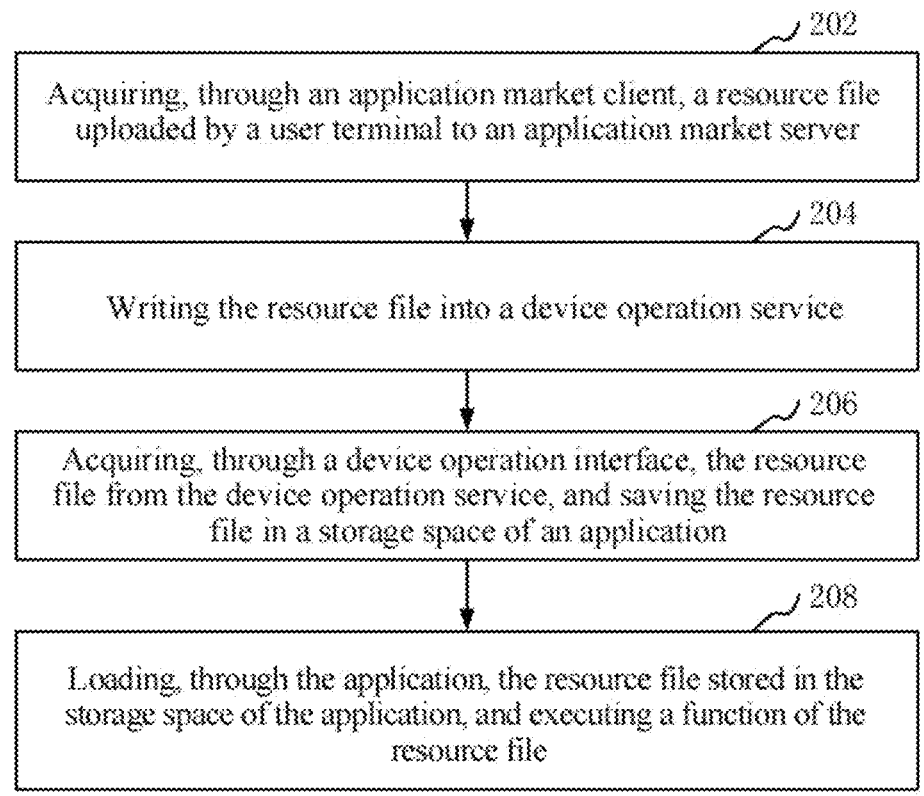
FIG. 2 is a schematic flowchart of a method for custom development of a payment application in one embodiment.

In an embodiment, as shown in FIG. 2, a method for custom development of a payment application is provided, for example, the method is applied to the POS terminal in FIG. 1, and includes steps 202, 204, 206 and 208.

In step 202: a resource file uploaded by a user terminal to an application market server is acquired through an application market client.

In the step 202, the resource file refers to specific contents realized by the user according to the use's own requirements.

Specifically, when the user has new requirements, the POS terminal is abstracted to form a device operation interface according to the requirements of the user, and then the user develops specific functions according to the device operation interface, thereby the resource file capable of realizing customized functions is acquired. Next, the user signs the resource file to acquire signature information of the resource file, and the resource file and the signature information of the resource file are uploaded by the user terminal to the application market server. The resource file and the signature information of the resource file uploaded by the user terminal are downloaded by the POS terminal from the application market server through the application market client.

In step 204, the resource file is written into a device operation service.

Specifically, the POS terminal invokes the device management interface through the application market client to store the resource file in a cache region, and then verifies whether the signature information of the resource file is correct, and if the signature information of the resource file is correct, then the resource file, a name of the resource file and the hash value of the resource file are written into a database of the device operation service. If the signature information of the resource file is incorrect, then the resource file will not be written.

In step 206: the resource file from the device operation service is acquired through a device operation interface, and saved the same in a storage space of an application.

Specifically, after writing the resource file into the device operation service, the POS terminal acquires the resource file from the device operation service through the device operation interface of the application, and saves the resource file in the storage space of the application. Further, in case that the resource file is stored in the application for the first time, the resource file is directly acquired from the device operation service and stored in the storage space of the application. In case that the resource file has already been stored in the application, it is necessary to first determine whether the resource file in the device operation service has an update, and if the resource file has an update, then the resource file already stored in the application will be replaced. If the resource file has no update, then it is unnecessary to re-fetch the resource file from the device operation service.

In step 208: the resource file stored in the storage space of the application is loaded through the application, and a function of the resource file is executed.

Specifically, the POS terminal invokes a system interface through the device operation interface of the application, and loads the resource file stored in the storage space of the application, so as to execute the function of the resource file.

In the above-mentioned method for custom development of a payment application, the resource file uploaded by the user terminal to the application market server is acquired through the application market client, and written the same into the device operation service. The resource file is realized by the user himself, which enables the user to complete a customization according to his own requirements, and thus the universality of the customized development platform of the payment application is achieved. The resource file is acquired from the device operation service through the device operation interface, and saved the same in the storage space of the application, so that the resource file can be directly acquired from the storage space of the application, saving the time to invoke the resource file from the device operation service. Moreover, the resource file saved in the storage space of the application is loaded through the application to execute the function of the resource file, so that the problem of waiting for the released of the new version caused by the usual way of solidifying code can be avoided, which helps to improve the stability of the custom development platform of the payment application, and the convenience of updating resource files.

Figure 3:
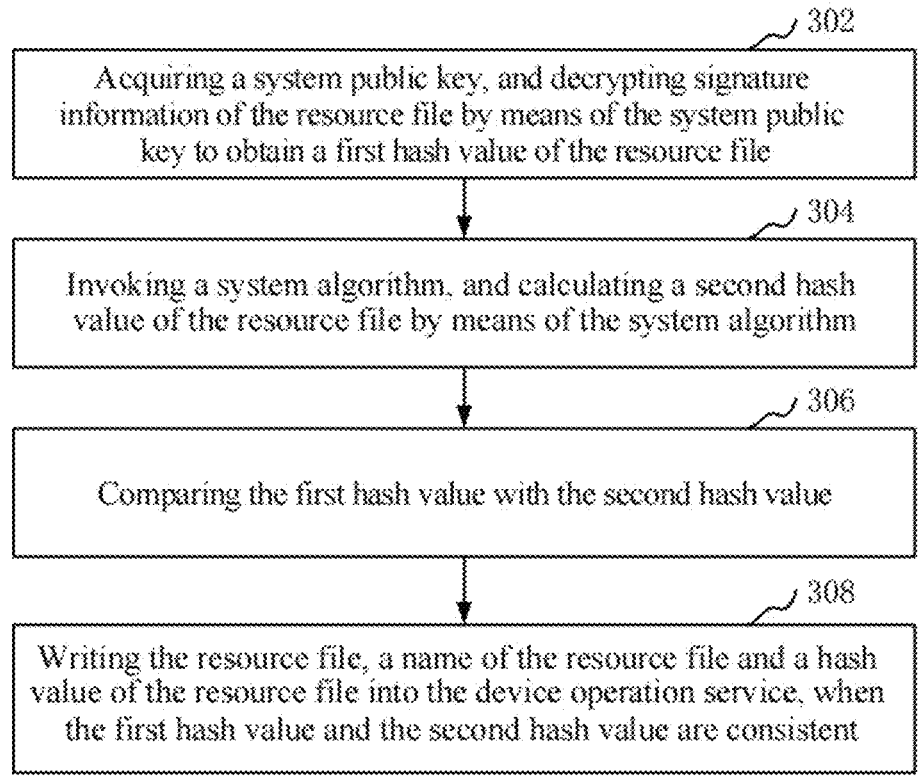
FIG. 3 is a schematic flowchart of steps for writing a resource file in one embodiment.

In one embodiment, as shown in FIG. 3, the step of writing the resource file into the device operation service may include steps 302, 304, 306 and 308.

In step 302: a system public key is acquired, and signature information of the resource file is decrypted by means of the system public key to obtain a first hash value of the resource file.

In the step 302, the public key refers to the non-secret half of the key pair used with the public key algorithm. The public key may be typically used to encrypt a session key, verify a digital signature, or encrypt data that can be decrypted with the corresponding private key. The hash value is a numerical value acquired by performing a logical operation on the data of the file content. Even if two files have the same name but different file contents, the hash values of the two are different. Similarly, two files with the same content but different names have the same hash value. Therefore, the hash value can be used as verification information for determining whether the file is complete and whether the file has been tampered with.

Specifically, when the POS terminal writes the resource file into the device operation service through a file operation interface, the system public key is acquired firstly, then the signature information of the resource file is decrypted by means of the system public key, and then the hash value of the resource file is acquired after the encryption.

In step 304, a system algorithm is invoked, and a second hash value of the resource file is calculated by means of the system algorithm.

In step 306, the first hash value is compared with the second hash value.

In step 308, the resource file, a name of the resource file and a hash value of the resource file are written into the device operation service, when the first hash value and the second hash value are consistent.

Specifically, the POS terminal invokes the file operation interface of the device operation service through the device management interface, and stores the resource file and the signature information of the resource file in the cache region. Then, the POS terminal decrypts the signature information of the resource file by means of the system public key to acquire the hash value of the resource file, and then invokes the system algorithm to calculate the hash value of the resource file. The hash values of the same resource file acquired by the two ways are compared whether the hash values of the two are consistent. In case that the hash values of the two are consistent, it is indicated that the resource file is not tampered with, which is correct. Subsequently, the resource file is read from the cache region, but the signature information of the resource file is not read, and the resource file, the name of the resource file and the hash value of the resource file are written into the database of the device operation service through the database operation interface. If the hash values of the same resource file acquired by the two ways are inconsistent, it is indicated that the resource file may be tampered with during the download process or the resource file may be changed due to a download error, then the resource file will not be saved by the device operation service and information about write error will be sent back through the file operation interface.

In the above method for custom development of the payment application, the hash value acquired by means of a decryption of the public key and the hash value calculated by means of the system algorithm are compared to determine whether the hash values of the same resource file acquired through the two ways are consistent, so as to determine whether an error is occurred during a download process of the resource file, which can ensure the accuracy and integrity of the resource file.

Figure 4:
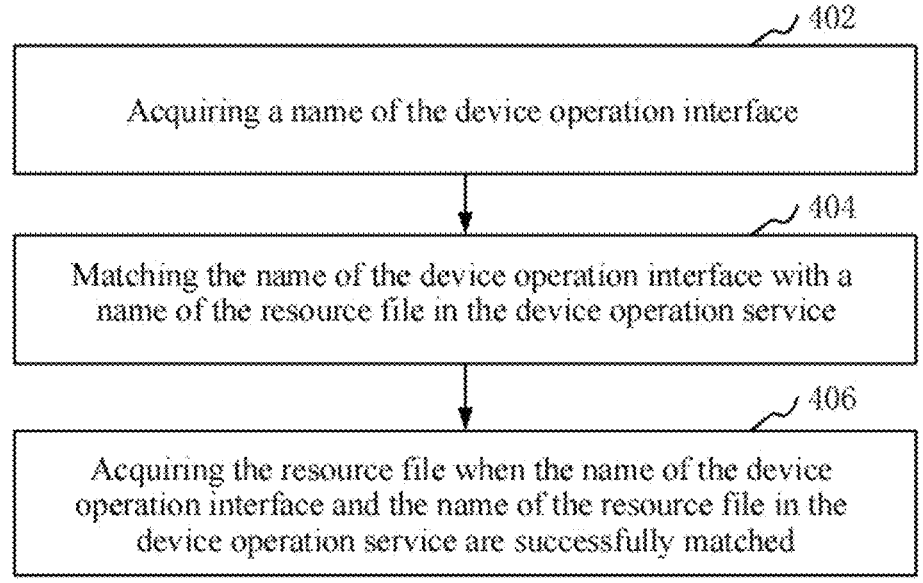
FIG. 4 is a schematic flowchart of steps for acquiring a resource file in one embodiment.

In one embodiment, as shown in FIG. 4, the step of acquire a corresponding resource file from the device operation service through the device operation interface may include steps 402, 404 and 406.

In step 402: a name of the device operation interface is acquired.

Specifically, the name of the device operation interface of the application on the POS terminal is unique, and the name of each device operation interface and the corresponding resource file are matched in a unique way. The device operation interface is an interface realized by the POS terminal according to business requirements of the user. The realized device operation interface is sent by the POS terminal to the user to instruct the user to complete specific function realization according to the device operation interface. The name of the device operation interface may be, but not limited to, a user-defined name. The unique identifier of the device operation interface of the application is acquired by the POS terminal according to the application operated by the user.

In step 404: a matching is performed between the name of the device operation interface and a name of the resource file in the device operation service.

Specifically, the POS terminal will acquire the name of the device operation interface of the application, and then access the device operation service through the device operation interface of the application, and acquire the name of the resource file stored in the storage space of the device operation service in the device operation service. Then, the POS terminal matches the name of the device operation interface with the name of the resource file.

In step 406, the resource file is acquired when the name of the device operation interface and the name of the resource file in the device operation service are successfully matched.

Specifically, the matching for the name of the device operation interface and the name of the resource file may be a keyword matching. The POS terminal first extracts keywords from the name of the device operation interface, and then performs a matching for the extracted keywords and the name of the resource file in the device operation service. When the keyword is found in the name of the resource file, the matching is determined to be successful. Then, it is determined that the resource file whose name is successfully matched is the file to be acquired, and the resource file whose name is successfully matched is acquired.

The above-mentioned method for custom development of a payment application, by acquiring the keyword of the name of the device operation interface, the name of the resource file in the device operation service is searched for matching according to the keyword. When the name of the device operation interface and the name of the resource file in the device operation service match successfully, the resource file whose name matches successfully is acquired. The corresponding resource file can be accurately acquired through the keyword matching of the name, so that the response can be completed quickly.

Figure 5:
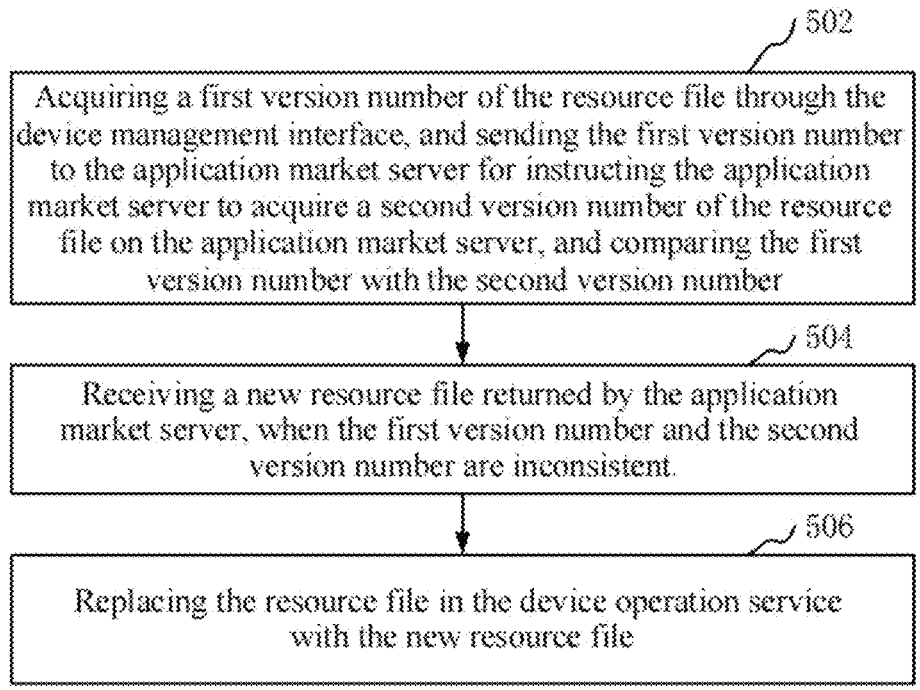
FIG. 5 is a schematic flowchart of steps for updating a resource file in one embodiment.

In one embodiment, as shown in FIG. 5, after the resource file is written into the device operation service, the method also includes steps 502, 504 and 506.

In step 502: a first version number of the resource file is acquired through the device management interface, and the first version number is sent to the application market server for instructing the application market server to acquire a second version number of the resource file on the application market server, and the first version number is compared with the second version number.

Specifically, the resource file in the device operation service is loaded by the POS terminal through the device management interface to acquire the first version number of the resource file. Then, the POS terminal invokes the device management interface through the application market client to acquire the first version number of the resource file, uploads the first version number of the resource file to the application market server, where the first version number is used to instruct the application market server to acquire the second version number of the resource file on the application market server, and compares the first and second version numbers.

In step 504, a new resource file returned by the application market server is received, when the first version number and the second version number are inconsistent.

In step 506, the resource file in the device operation service is replaced with the new resource file.

Specifically, when the first version number and the second version number are inconsistent, it is determined that the application market server has an updated resource file. The updated resource file is also uploaded by the user terminal to the application market server. Then, the file operation interface of the device operation service is invoked again, and the resource file of the second version number downloaded from the server is verified in the same way. After the verification is successful, the resource file of the second version number is written into the device operation service. Then, the resource file of the first version number in the device operation service is replaced with the resource file of the second version number. The version number of the resource file on the device operation service of the POS terminal is compared with the version number of the resource file on the server to determine whether the resource file has an update, such that the resource file of the POS terminal can be updated in time, and the POS terminal can have a more comprehensive function, and thus providing the user with more comprehensive services.

Figure 6:
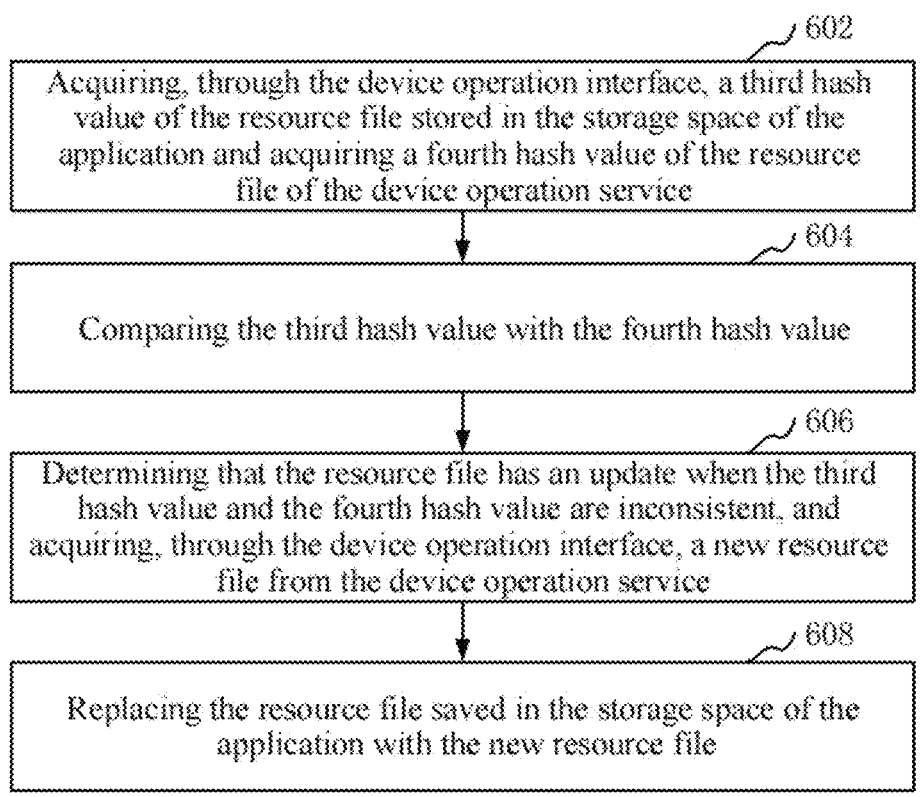
FIG. 6 is a schematic flowchart of steps for updating a resource file in another embodiment.

In another embodiment, as shown in FIG. 6, the step of acquiring, through the device operation interface, the resource file from the device operation service, and saving the resource file in a storage space of an application may include steps 602, 6004, 606 and 608.

In step 602: a third hash value of the resource file stored in the storage space of the application is acquired through the device operation interface, and a fourth hash value of the resource file of the device operation service is acquired.

Specifically, when the system interface is invoked by the POS terminal through the device operation interface to execute the function of the resource file, it may be necessary to first verify whether the resource file has an update. Then, the device operation interface of the application is invoked by the POS terminal to acquire the third hash value of the resource file in the storage space of the application, and the third hash value of the resource file is stored in a local memory. Then the POS terminal continues to invoke the device operation interface of the application to access the device operation service, determines the resource file whose name matches with the name of the device operation interface from the device operation service, and acquires the fourth hash value of the resource file whose name matches.

In step 604, the third hash value is compared with the fourth hash value.

In step 606, it is determined that the resource file has an update when the third hash value and the fourth hash value are inconsistent, and a new resource file is acquired through the device operation interface from the device operation service.

In step 608, the resource file saved in the storage space of the application is replaced with the new resource file.

Specifically, the POS terminal compares the third hash value with the fourth hash value, in case that the third hash value and the fourth hash value are consistent, it is determined that the resource file has no update and then the POS terminal returns to the memory space of the application to acquire the resource file in the memory space of the application to execute the corresponding operations. In case that the third hash value and the fourth hash value are inconsistent, it is determined that the resource file has an update, and then the POS terminal acquire the new resource file from the device operation service, and returns to the memory space of the application to replace the resource file already saved in the storage space of the application with the new resource file, meanwhile, the hash value of the resource file in the local memory is replaced by the hash value of the new resource file.

In the above-mentioned method for custom development of a payment application, the hash value of the resource file stored in the storage space of the application is acquired from the local memory, and compared with the hash value of the resource file stored in the device operation service to determine whether the resource file has an update. When the hash values of the two are inconsistent, indicating that the resource file has an update, then the corresponding resource file in the memory of the application is updated, so that the update of the resource file can be automatically realized, and the latest function can be provided to the user in time.

In one embodiment, before the third hash value of the resource file stored in the storage space of the application is acquired through the device operation interface, and before the fourth hash value of the resource file of the device operation service is acquired, the method may also include: receiving an operation on the application, and invoking the corresponding device operation interface according to the operation.

Specifically, when receiving the user's operation instruction to the application, the POS terminal invokes the corresponding device operation interface according to the operation instruction, and then determines, through the corresponding device operation interface whether the resource file has an update. In case that the resource file has an update, the resource file in the storage space of the application is updated first, and then the function of the resource file is loaded and executed through the corresponding device operation interface to complete a response to the user. In case that the resource file has no update, the POS terminal can directly acquire the corresponding resource file from the storage space of the application by invoke the corresponding device operation interface according to the user's operation instruction to the application, and then execute the function of the resource file to complete the response. By receiving the user's operation instruction to the application, each time the POS terminal receives the user's operation instruction, the corresponding device operation interface is invoked first to determine whether the resource file has an update, so that the resource file in the storage space of the application can be updated in time.

In this embodiment, the POS terminal can also automatically update the resource file. The POS terminal can be preset with automatic updates, for example, every few hours or days. When a specified duration is reached, the POS terminal at can automatically invoke the corresponding device operation interface to determine whether the resource file in the storage space of the application has an update. The POS terminal can automatically update the resource file at regular intervals, so that the resource file can be updated even when the POS terminal has not received an operation instruction from the user for a long time.

Figure 7:
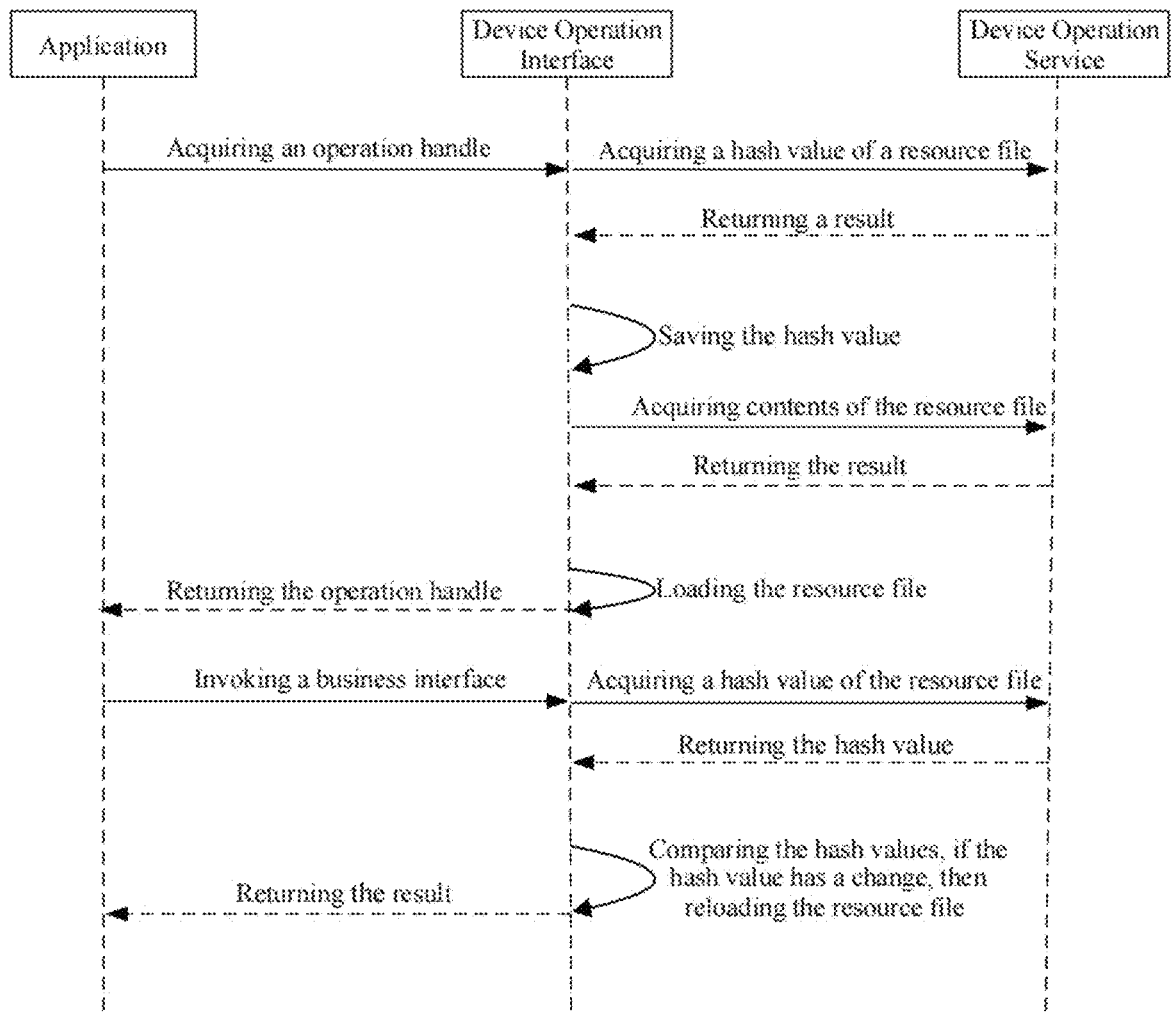
FIG. 7 is a schematic flowchart of steps for completing a response operation in one embodiment.

As shown in FIG. 7, it is provided a process for invoking a resource file by a POS terminal to complete a response operation in accordance with an embodiment. Specifically, the application on the POS terminal receives an operation of a user, and acquires an operation handle from the device operation interface according to the operation. Before the device operation interface returns the operation handle, the hash value of the corresponding resource file from the device operation service is first acquired and saved the same in the corresponding storage space of the application. Then the resource file is acquired and saved the same in the corresponding storage space of the application. Then, the POS terminal invokes the system interface through the device operation interface to load the resource file, and returns the operation handle to the application through the device operation interface. When the application receives an operation of the user again, the POS terminal first verifies whether the resource file in the device operation service has an update, so as to determine whether the resource file in the application is required to be updated. Then the application invokes the device operation interface through the operation handle to acquire the hash value of the corresponding resource file in the device operation service, then acquires the hash value of the resource file in the storage space of the application, and compares the hash values of the two. In case that the hash values of the two are inconsistent, it is determined that the resource file has an update. Then, the updated resource file in the device operation service is acquired to replace the resource file in the storage space of the application, and the result is returned to the application. The application invokes the device operation interface through the operation handle, and invokes the system interface through the device operation interface to load the updated resource file, so as to complete the response to the operation.

In one embodiment, the method for custom development of the payment application may be implemented as follows:

The resource file uploaded by the user terminal to the application market server is acquired by the POS terminal through the application market client.

Next, the system public key is acquired by the POS terminal, and by means of the system public key, the signature information of the resource file is decrypted to obtain the first hash value of the resource file. The system algorithm is invoked by the POS terminal, and the second hash value of the resource file is calculated by means of the system algorithm.

Further, the first hash value and the second hash value are compared by the POS terminal; and the resource file, the name of the resource file and the hash value of the resource file are written by the POS terminal into the device operation service, when the first hash value and the second hash value are consistent.

Optionally, the first version number of the resource file is acquired by the POS terminal through the device management interface, and the first version number is sent to the application market server, where the first version number is used to instruct the application market server to acquire the second version number of the resource file on the application market server. A comparison is performed to the first version number with the second version number.

Next, in case that the first version number and the second version number are inconsistent, the new resource file returned by the application market server is received by the POS terminal; and the resource file in the device operation service is replaced with the new resource file.

Next, the name of the device operation interface is acquired by the POS terminal, and the matching for the name of the device operation interface and the name of the resource file in the device operation service is performed.

Further, when the name of the device operation interface and the name of the resource file in the device operation service are successfully matched, the resource file whose name is successfully matched is acquired and stored in the storage space of the application.

Optionally, the operation on the application is received by the POS terminal, and according to the operation, the corresponding device operation interface is invoked.

Next, the third hash value of the resource file stored in the storage space of the application and the fourth hash value of the resource file in the device operation service are acquired by the POS terminal through the device operation interface.

Next, the third hash value and the fourth hash value are compared by the POS terminal; when the third hash value and the fourth hash value are inconsistent, it is determined that the resource file has an update, and then a new resource file in the device operation service is acquired by the POS terminal through the device operation interface.

Further, the resource file stored in the storage space of the application is replaced by the POS terminal with the new resource file.

Next, the resource file stored in the storage space of the application is loaded by the POS terminal through the application to execute the function of the resource file.

In the above-mentioned method for custom development of a payment application, the resource file uploaded by the user terminal to the application market server is acquired through the application market client, which can realize the customization function for business requirements of the user, and has great flexibility. The hash value of the resource file is acquired through a decryption of the signature information of the resource file by means of the system public key, and then the hash value of the resource file is calculated by means of the system algorithm, if the hash values of the two are consistent, it is proved that the resource file is complete, then the resource file is written into the device operation service of the POS terminal. The hash value of the same resource file is determined through two different ways to determine the integrity and accuracy of the resource file. Subsequently, the resource file on the server may have an update, the first version number corresponding to the resource file in the storage space of the application is acquired by the POS terminal from the local memory, and the first version number is uploaded to the application market server to instruct the application market server to acquire the second version number of the resource file on the application market server, then the first version number is compared with the second version number, if the version numbers of the two are different, then the resource file on the server is acquired to update the resource file in the device operation service in the POS terminal. Then the corresponding device operation interface is invoked by the POS terminal to acquire the corresponding resource file from the device operation service, and stored the same in the corresponding storage space of the application, so that the resource file can be directly acquired from the storage space of the application when the resource file is invoked again, saving the time to invoke from the device operation service, and thus the response can be completed quickly. When the user's operation on the application is received by the POS terminal, the third hash value of the resource file stored in the corresponding memory of the application is acquired through the device operation interface, the fourth hash value of the resource file of the device operation service is acquired, and the third hash value and the fourth hash value are compared, and if the third hash value and the fourth hash value are inconsistent, then a new resource file is acquired from the device operation service to replace the resource file in the storage space of the application, thereby updating the resource file in the storage space of the application. By adopting this method, the problem of waiting for the release of the new version caused by the usual way of solidifying the code can be avoided, and the stability of the customized development platform of the payment application and the convenience of updating resource files can be improved.

Figure 8:
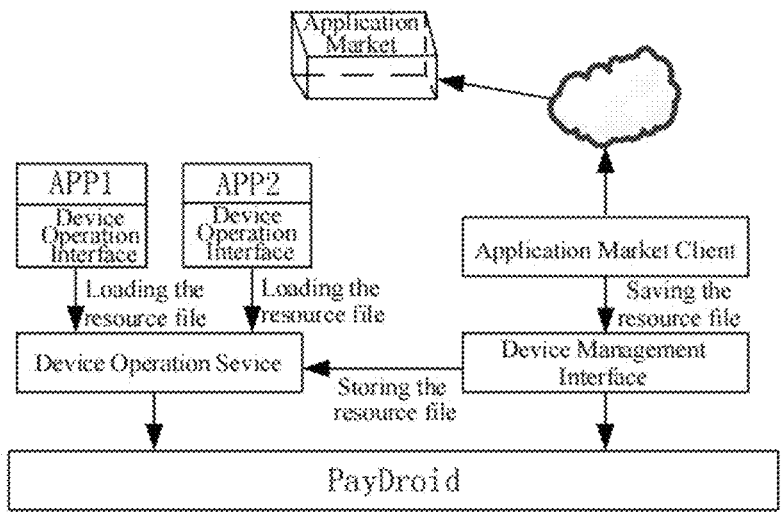
FIG. 8 is a schematic flowchart of steps for adding a new function in one embodiment.

As shown in FIG. 8, it is illustrated a process of adding a new function to a POS terminal by a user in accordance with an embodiment.

PayDroid is an Android system customized for the POS terminal, where the POS terminal runs on the Android system. APP1, APP2, device operation service and application market client are multiple applications in the POS terminal. The APP1, APP2 and the device operation interface may form a runnable application program. The device management interface and the application market client may form a runnable application program. The application market server is a server corresponding to the application market client. When the user has business requirements, the POS terminal is abstracted into a customized device operation interface according to the business requirements of the user, and then the corresponding customized function is realized by the user according to the device operation interface. The user packages and compresses the code for realizing the customized function into a resource file, signs the compressed file, and uploads the same to the application market server. The POS terminal downloads the resource file and the signature information of the resource file uploaded by the user terminal from the application market server through the application market client. The POS terminal invokes the device management interface through the application market client to store the resource file in the cache region, and then verifies whether the signature information of the resource file is correct. If yes, then writes the resource file, the name of the resource file and the hash value of the resource file into the database of the device operation service. The resource file is acquired from the device operation service through the device operation interface of the application, and saved the same into the storage space of the application. The system interface is invoked by POS terminal through the device operation interface of the application to load the resource file stored in the storage space of the application, so as to execute the function of the resource file.

For example, the user wishes to add a new function to the POS terminal, which is that only bank cards can be swiped in APP1, and only membership cards can be swiped in APP2. The POS terminal acquires the requirement of the user that only bank cards can be swiped in APP1, and only membership cards can be swiped in APP2. According to this requirement, two device operation interfaces are created. Then, the resource file that can realize this function is acquired by the POS terminal from the application market server through the application market client, and saved the same through the device management interface. Then, the file operation interface of the device operation service is invoked through the device management interface to write the resource file into the database of the device operation service. The device operation interfaces of APP1 and APP2 are invoked by the POS terminal to read the resource file from the database of the device operation service, and save the same in the storage space corresponding to APP1 and APP2. When this function is required, the device operation interface is invoked to first determine whether the resource file has an update. If the resource file has an update, the resource file in the storage space of the application is updated, and then the resource file is acquired from the storage space of the corresponding APP and loaded the same to realize the function of the resource file. If the resource file has no update, the resource file in the storage space of the APP is directly loaded to executed the function of the resource file.

It should be understood that although the steps in the flowcharts of FIGS. 1-8 are shown in sequence according to the arrows, these steps are not necessarily executed in the sequence shown by the arrows. Unless explicitly stated herein, the execution of these steps is not strictly limited to the order, and these steps may be performed in other orders. Moreover, at least a part of the steps in FIGS. 1-8 may include multiple sub-steps or multiple stages. These sub-steps or stages are not necessarily executed and completed at the same time, but may be executed at different times. The order of execution of these sub-steps or stages are not necessarily completed in sequence, but may be performed alternately or alternately with other steps or at least a part of sub-steps or stages of other steps.

Figure 9:
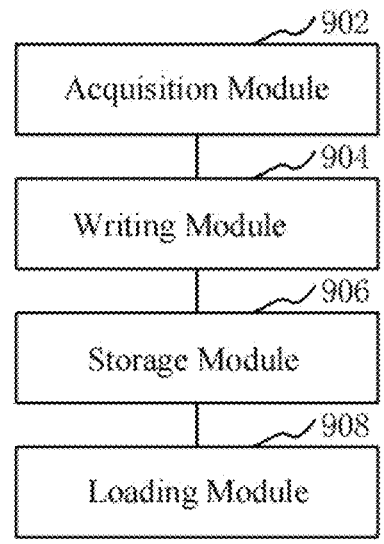
FIG. 9 is a structural block diagram of an apparatus for custom development of a payment application in one embodiment.

In one embodiment, as shown in FIG. 9, an apparatus for custom development of a payment application is provided, including: an acquisition module 902, a writing module 904, a storage module 906 and a loading module 908. In which:

The acquisition module 902 is configured to acquire, through an application market client, a resource file uploaded by a user terminal to an application market server.

The writing module 904 is configured to write the resource file into a device operation service.

The storage module 906 is configured to acquire the resource file from the device operation service through a device operation interface, and save the resource file in a storage space of an application.

The loading module 908 is configured to load the resource file saved in the storage space of the application through the application, and execute a function of the resource file.

In the above-mentioned apparatus for custom development of the payment application, the resource file uploaded by the user terminal to the application market server is acquired through the application market client, and written the same into the device operation service. The resource file is realized by the user himself, which enables the user to complete a customization according to his own requirements, and thus the universality of the customized development platform of the payment application is achieved. The resource file is acquired from the device operation service through the device operation interface, and saved the same in the storage space of the application, so that the resource file can be directly acquired from the storage space of the application, saving the time to invoke the resource file from the device operation service. The resource file is used as an insertion, the corresponding interface is invoked by the application to load the resource file saved in the storage space of the application and to execute the function of the resource file, so that the problem of waiting for the released of the new version caused by the usual way of solidifying code can be avoided, which helps to improve the stability of the custom development platform of the payment application, and the convenience of updating resource files.

Figure 10:
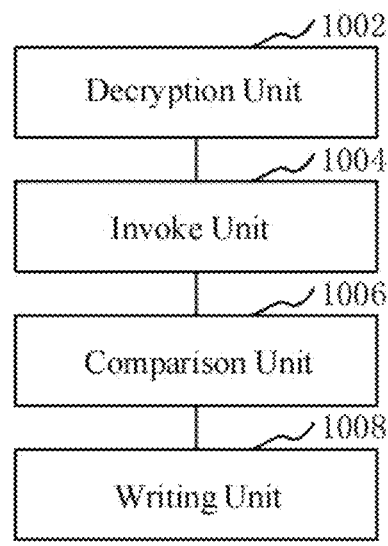
FIG. 10 is a structural block diagram of an apparatus for custom development of a payment applications in another embodiment.

In one embodiment, as shown in FIG. 10, the writing module 904 includes: a decryption unit 1002, an invoke unit 1004, a comparison unit 1006 and a writing unit 1008. In which, The decryption unit 1002 is configured to acquire a system public key, and to decrypt, by means of the system public key, signature information of the resource file to obtain a first hash value of the resource file.

The invoke unit 1004 is configured to invoke a system algorithm, and to calculate, by means of the system algorithm, a second hash value of the resource file.

The comparison unit 1006 is configured to compare the first hash value with the second hash value.

The writing unit 1008 is configured to write the resource file, a name of the resource file and the hash value of the resource file into the device operation service when the first hash value and the second hash value are consistent.

In the above-mentioned apparatus for custom development of a payment application, the hash value acquired by means of a decryption of the public key and the hash value calculated by means of the system algorithm are compared to determine whether the hash values of the same resource file acquired through the two ways are consistent, so as to determine whether an error is occurred during a download process of the resource file, which can ensure the accuracy and integrity of the resource file.

In one embodiment, the storage module is also configured to: acquire the name of the device operation interface; match the name of the device operation interface with the name of the resource file in the device operation service; and acquire the resource file when the name of the device operation interface and the name of the resource file in the device operation service are matched successfully. By acquiring the keyword of the name of the device operation interface, the name of the resource file in the device operation service is searched for matching according to the keyword. When the name of the device operation interface and the name of the resource file in the device operation service are matched successfully, the resource file whose name is matched successfully is acquired. The corresponding resource file can be accurately acquired through the keyword matching of the name, so that the response can be completed quickly.

In one embodiment, the apparatus for custom development of the payment application also includes: a replacement module. The replacement module is configured to: acquire a first version number of the resource file through the device management interface, and send the first version number to the application market server, where the first version number is used to instruct the application market server to acquire a second version number of the resource file on the application market server, and compare the first version number with the second version number; receive a new resource file returned by the application market server when the first version number and the second version number are inconsistent; and replace the resource file in device operation service with the new resource file. The version number of the resource file in the device operation service of the POS terminal is compared with the version number of the resource file on the server to determine whether the resource file has an update, so that the resource file of the POS terminal can be updated in time, and thus the POS terminal has a more comprehensive function, so as to provide the user with more comprehensive services.

In one embodiment, the storage module is also configured to: acquire a third hash value of the resource file stored in the storage space of the application through the device operation interface, and acquire a fourth hash value of the resource file of the device operation service; compare the third hash value with the fourth hash value; determine that the resource file has an update when the third hash value and the fourth hash value are inconsistent, and acquire a new resource file from the device operation service through the device operation interface; and replace the resource file saved in the storage space of the application with the new resource file. In the apparatus for custom development of the payment application, the hash value of the resource file stored in the storage space of the application is acquired from the local memory, and compared the same with the hash value of the resource file stored in the device operation service to determine whether the resource file has an update. When the hash values of the two are inconsistent, indicating that the resource file has an update, the resource file in the corresponding memory of the application is updated, so that the update of the resource file can be automatically realized, and the latest function can be provided to the user in time.

In one embodiment, the apparatus also includes: an invoke module. The invoke module is configured to receive an operation on the application, and invoke the corresponding device operation interface according to the operation. By receiving the user's operation instruction to the application, each time the POS terminal receives the user's operation instruction, the corresponding device operation interface is invoked first to determine whether the resource file has an update, so that the resource file in the application storage space can be updated in time.

For the specific definitions of the apparatus for custom development of the payment application, reference may be made to the above definitions of the method for custom development of the payment application, which will not be repeated here. Each module in the above-mentioned apparatus for custom development of the payment application can be implemented in whole or in part by software, hardware or combinations thereof. The above modules can be embedded in or independent of a processor in a computer equipment in the form of hardware, or stored in a memory in the computer equipment in the form of software, so that the processor can invoke and execute the operations corresponding to the above modules.

Figure 11:
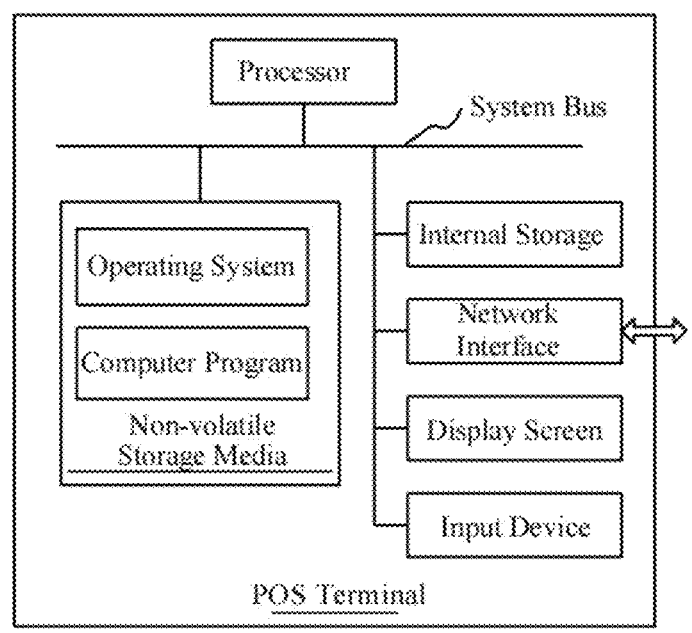
FIG. 11 is an internal structure diagram of a computer equipment in one embodiment.

In one embodiment, a computer equipment is provided, the computer equipment may be a POS terminal, and the internal structure diagram may be as shown in FIG. 11. The computer equipment includes a processor, a memory, a network interface, a display screen, and an input device which are connected through a system bus. The processor of the computer equipment is used to provide computing and control capabilities. The memory of the computer equipment includes a non-volatile storage medium and an internal memory. The non-volatile storage medium stores an operating system and a computer program. The internal memory provides an environment for the execution of the operating system and the computer program in the non-volatile storage medium. The network interface of the computer equipment is configured to communicate with an external terminal through a network connection. The computer program, when executed by the processor, implements the method for custom development of the payment application. The display screen of the computer equipment may be a liquid crystal display screen or an electronic ink display screen, and the input device of the computer equipment may be a touch layer covered on the display screen, or may be buttons, a trackball or a touchpad arranged on the shell of the computer equipment, and also may be an external keyboard, trackpad, or mouse.

It can be understood for those skilled in the art that the structure shown in FIG. 11 is only a block diagram of a partial structure related to the solution of the present application, and does not constitute a limitation on the computer equipment to which the solution of the present application is applied. Specifically, the computer equipment may include more or lesser components than that shown in the figures, or a combination of certain components, or may have a different arrangement of components.

In one embodiment, a computer equipment is provided, including a memory and a processor, where a computer program is stored in the memory, and the computer program when being executed by the processor, causes the processor to implement the steps of the above-mentioned method for custom development of a payment application.

In one embodiment, a computer-readable storage medium is provided, on which a computer program is stored, and when the computer program is executed by a processor, the steps of the above-mentioned method for custom development of a payment application is implemented.

It can be understood for those skilled in the art that all or part of the processes in the method of the above-mentioned embodiments can be completed by instructing the relevant hardware through a computer program, and the computer program can be stored in a non-volatile computer-readable storage medium. When the program is executed, the flows of the embodiments of the above-mentioned methods may be included. In which, any reference to the memory, storage, database or other medium used in the various embodiments provided in this application may include non-volatile and/or volatile memory. The non-volatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration but not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchronization link (Synchlink) DRAM (SLDRAM), memory bus (Rambus) direct RAM (RDRAM), direct memory bus dynamic RAM (DRDRAM), and memory bus dynamic RAM (RDRAM) and so on.

The features of the above embodiments may be combined arbitrarily. For brevity of description, not all possible combinations of the features in the above embodiments are described. However, as long as there is no contradiction in the combination of these technical features, they shall be considered to be within the scope of this specification.

The above examples only represent several embodiments of the present application, and the descriptions thereof are relatively specific and detailed, but should not be construed as limitations on the scope of the present application. It should be noted for those skilled in the art that, without departing from the concept of the present application, several modifications and improvements can be made, which are all included within the protection scope of the present application. Therefore, the protection scope of the present application shall be subject to the appended claims.

What is claimed is:

1. A method for custom development of a payment application, comprising:
   acquiring, through an application market client, a resource file uploaded by a user terminal to an application market server;
   writing the resource file into a device operation service;
   acquiring, through a device operation interface, the resource file from the device operation service, and saving the resource file in a storage space of an application; and
   loading, through the application, the resource file stored in the storage space of the application, and executing a function of the resource file,
   wherein said writing the resource file into a device operation service comprises:
   acquiring a system public key, and decrypting signature information of the resource file by means of the system public key, to obtain a first hash value of the resource file;
   invoking a system algorithm, and calculating a second hash value of the resource file by means of the system algorithm;
   comparing the first hash value with the second hash value; and
   writing the resource file, a name of the resource file, and a hash value of the resource file into the device operation service when the first hash value and the second hash value are consistent.

2. The method according to claim 1, wherein said acquiring, through a device operation interface, the resource file from the device operation service, comprises:

acquire a name of the device operation interface;

matching the name of the device operation interface with a name of the resource file in the device operation service; and acquiring the resource file when the name of the device operation interface and the name of the resource file in the device operation service are successfully matched.

3. The method according to claim 1, wherein after the resource file is written into the device operation service, the method further comprises:

acquiring a first version number of the resource file through a device management interface, and sending the first version number to the application market server, wherein the first version number is used to instruct the application market server to acquire a second version number of the resource file, and comparing the first version number with the second version number;

receiving a new resource file returned by the application market server when the first version number and the second version number are inconsistent; and replacing the resource file in the device operation service with the new resource file.

4. The method according to claim 3, wherein said acquiring, through a device operation interface, the resource file from the device operation service, and saving the resource file in a storage space of an application, comprises:

acquiring, through the device operation interface, a third hash value of the resource file stored in the storage space of the application, and acquiring a fourth hash value of the resource file of the device operation service;

comparing the third hash value with the fourth hash value;

determining that the resource file has an update when the third hash value and the fourth hash value are inconsistent, and acquiring a new resource file from the device operation service through the device operation interface; and replacing the resource file saved in the storage space of the application with the new resource file.

5. The method according to claim 4, wherein before the third hash value of the resource file saved in the storage space of the application is acquired through the device operation interface, and the fourth hash value of the resource file of the device operation service is acquired, the method further comprises:

receiving an operation on the application, and invoking a corresponding device operation interface according to the operation.

6. A computer equipment, comprising a memory and a processor, and the memory storing a computer program, wherein the computer program, when being executed by the processor, causes the processor to perform operations that comprise:

acquiring, through an application market client, a resource file uploaded by a user terminal to an application market server;

writing the resource file into a device operation service;

acquiring, through a device operation interface, the resource file from the device operation service, and saving the resource file in a storage space of an application; and loading, through the application, the resource file stored in the storage space of the application, and executing a function of the resource file, wherein the operation of writing the resource file into a device operation service comprises:

acquiring a system public key, and decrypting signature information of the resource file by means of the system public key, to obtain a first hash value of the resource file;

invoking a system algorithm, and calculating a second hash value of the resource file by means of the system algorithm;

comparing the first hash value with the second hash value; and writing the resource file, a name of the resource file, and a hash value of the resource file into the device operation service when the first hash value and the second hash value are consistent.

7. The computer equipment according to claim 6, wherein the operation of acquiring, through a device operation interface, the resource file from the device operation service comprises:

acquire a name of the device operation interface;

matching the name of the device operation interface with a name of the resource file in the device operation service; and acquiring the resource file, when the name of the device operation interface and the name of the resource file in the device operation service are successfully matched.

8. The computer equipment according to claim 6, wherein after the resource file is written into the device operation service, the operations performed the processor further comprise:

acquiring a first version number of the resource file through a device management interface, and sending the first version number to the application market server, wherein the first version number is used to instruct the application market server to acquire a second version number of the resource file, and comparing the first version number with the second version number;

receiving a new resource file returned by the application market server when the first version number and the second version number are inconsistent; and replacing the resource file in the device operation service with the new resource file.

9. The computer equipment according to claim 8, wherein the operation of acquiring, through a device operation interface, the resource file from the device operation service, and saving the resource file in a storage space of an application comprises:

acquiring, through the device operation interface, a third hash value of the resource file stored in the storage space of the application, and acquiring a fourth hash value of the resource file of the device operation service;

comparing the third hash value with the fourth hash value;

determining that the resource file has an update when the third hash value and the fourth hash value are inconsistent, and acquiring a new resource file from the device operation service through the device operation interface; and replacing the resource file saved in the storage space of the application with the new resource file.

10. The computer equipment according to claim 9, wherein before the third hash value of the resource file saved in the storage space of the application is acquired through the device operation interface, and the fourth hash value of the resource file of the device operation service is acquired, the operations performed by the processor further comprise:

receiving an operation on the application, and invoking a corresponding device operation interface according to the operation.

11. A non-transitory computer-readable storage medium, on which a computer program is stored, wherein, the computer program when being executed by a processor, causes the processor to perform operations that comprise:
   acquiring, through an application market client, a resource file uploaded by a user terminal to an application market server;
   writing the resource file into a device operation service;
   acquiring, through a device operation interface, the resource file from the device operation service, and saving the resource file in a storage space of an application; and
   loading, through the application, the resource file stored in the storage space of the application, and executing a function of the resource file,
   wherein the operation of writing the resource file into a device operation service comprises:
   acquiring a system public key, and decrypting signature information of the resource file by means of the system public key, to obtain a first hash value of the resource file;
   invoking a system algorithm, and calculating a second hash value of the resource file by means of the system algorithm;
   comparing the first hash value with the second hash value; and
   writing the resource file, a name of the resource file, and a hash value of the resource file into the device operation service when the first hash value and the second hash value are consistent.

12. The non-transitory computer-readable storage medium according to claim 11, wherein the operation of acquiring, through a device operation interface, the resource file from the device operation service comprises:
   acquire a name of the device operation interface;
   matching the name of the device operation interface with a name of the resource file in the device operation service; and
   acquiring the resource file, when the name of the device operation interface and the name of the resource file in the device operation service are successfully matched.

13. The non-transitory computer-readable storage medium according to claim 11, wherein after the resource file is written into the device operation service, the operations performed the processor further comprise:
   acquiring a first version number of the resource file through a device management interface, and sending the first version number to the application market server, wherein the first version number is used to instruct the application market server to acquire a second version number of the resource file, and comparing the first version number with the second version number;
   receiving a new resource file returned by the application market server when the first version number and the second version number are inconsistent; and
   replacing the resource file in the device operation service with the new resource file.

14. The non-transitory computer-readable storage medium according to claim 13, wherein the operation of acquiring, through a device operation interface, the resource file from the device operation service, and saving the resource file in a storage space of an application comprises:
   acquiring, through the device operation interface, a third hash value of the resource file stored in the storage space of the application, and acquiring a fourth hash value of the resource file of the device operation service;
   comparing the third hash value with the fourth hash value;
   determining that the resource file has an update when the third hash value and the fourth hash value are inconsistent, and acquiring a new resource file from the device operation service through the device operation interface; and
   replacing the resource file saved in the storage space of the application with the new resource file.

15. The non-transitory computer-readable storage medium according to claim 14, wherein before the third hash value of the resource file saved in the storage space of the application is acquired through the device operation interface, and the fourth hash value of the resource file of the device operation service is acquired, the operations performed by the processor further comprise:
   receiving an operation on the application, and invoking a corresponding device operation interface according to the operation.

* * * * *